United States Patent [19]

Howe

[11] 3,923,650
[45] Dec. 2, 1975

[54] PROCESS FOR REDUCING THE BIOLOGICAL AND CHEMICAL OXYGEN DEMAND OF SPENT ANTIBIOTIC FERMENTATION BROTH

[75] Inventor: Robert H. L. Howe, W. Lafayette, Ind.

[73] Assignee: Eli Lilly and Company, Indianapolis, Ind.

[22] Filed: Apr. 1, 1974

[21] Appl. No.: 457,151

[52] U.S. Cl. .................. 210/21; 210/23; 210/44; 210/73; 424/123
[51] Int. Cl.² .......................................... B01D 13/00
[58] Field of Search ............. 210/23, 44, 45, 73, 21; 424/123

[56] References Cited
UNITED STATES PATENTS

| | | | |
|---|---|---|---|
| 3,749,657 | 7/1973 | Bras et al. | 210/23 X |
| 3,836,457 | 9/1974 | Gross et al. | 210/196 X |
| 3,839,206 | 10/1974 | Welch | 210/321 X |

Primary Examiner—Frank A. Spear, Jr.
Attorney, Agent, or Firm—Ralph W. Ernsberger; Everet F. Smith

[57] ABSTRACT

A process is provided for reducing the biological and chemical oxygen demand of spent antibiotic fermentation broth which comprises treating the aqueous fermentation broth with or without one or more chemical coagulating and viscosity adjusting agents, removing the suspended solids from such broth by a two step centrifugation procedure followed by a coalescing strainer, subjecting the effluent from such solids removal step to a pressure of from about 200 to about 500 psig and contacting such broth with a semipermeable membrane adapted to restrict the passage of molecules having a molecular weight slightly below that of the molecular weight of the anitbiotic being processed. The antibiotic activity is concentrated and the permeate water flowing through such semipermeable membrane has a biological and chemical oxygen demand of from about 0.2 to about 0.4 g. per liter, or less.

9 Claims, 1 Drawing Figure

PROCESS FOR REDUCING THE BIOLOGICAL AND CHEMICAL OXYGEN DEMAND OF SPENT ANTIBIOTIC FERMENTATION BROTH

BACKGROUND OF THE INVENTION

1. Field of the Invention

This invention relates to a bio-chemical engineering process. More particularly, this invention relates to a process for reducing the biological and chemical oxygen demand of spent antibiotic fermentation broth by means of combining an effective solids removal step with a reverse osmosis operation.

2. Prior Art

Even since the development of the submerged culture fermentation of penicillin, the disposal of the waste products from the growth of the microorganism producing the antibiotic and the spent broth from the fermentation process has posed a problem. From this early development came the process wherein the antibiotic activity in the aqueous fermentation broth is partitioned into a water-immiscible solvent for further processing. However, few, if any of such processes have ever achieved a complete partitioning of any antibiotic from the fermentation broth to the solvent phase. Consequently, the disposal of the spent broth, from which a substantial portion of the antibiotic activity is removed, has always presented a problem because the residual antibiotic activity is organic in character and a large amount of oxygen is required to degrade such material in the water.

The isolation of antibiotic activity from a fermentation broth has classically proceeded along the following line. Inasmuch as such fermentation broth contains a large amount of suspended solid material and unutilized particles of fats and proteins, principally mycelia, it has been necessary to filter such broth to remove these suspended solids. In order to make the filtration step go faster it has become conventional to add a diatomaceous earth, perlite, attapulgite, or similar filter aid to the fermentation broth prior to the filtration operation. Consequently, the volume of the solid materials removed in the filtration operation has been increased by the amount of filter aid employed. Moreover, these filter aids are non-combustible. Furthermore, in order to dispose of such solid waste material a drying operation is required in many instances. The presence of the filter aid in the mycelia cake adds to the burden of the drying operation. In addition, a significant quantity of antibiotic acitivity is retained in the mycelia cake and reduces the efficiency of the conventional isolation and recovery operation.

With the suspended solids removed from the fermentation broth the conventional procedure has been to partition the antibiotic acitivity into a water-immiscible solvent by one of the many extraction processes known in the art. Some of such processes are mechanical, others are as simple as counter-current extraction operation in which the least dense of the two fluids is introduced near the bottom of a vertical column containing packing or bubble caps and the heavier of the fluids is introduced near the top. By producing turbulence within the column an extraction process takes place and the antibiotic activity is transferred from the aqueous phase to the solvent phase. However, as has been described hereinbefore, the partitioning operation is generally not wholly effective and some of the antibiotic activity remains in the spent broth. In many cases the quantity is too small to make an additional recovery operation economic because of the large volume of spent broth generally involved but, nevertheless, the antibiotic acitivity present constituents slowly degradable organic material that required oxygen for its destruction. Moreover, the residual nutrients, in many cases, which were provided in the fermentation process for the growth of the microorganism producing the antibiotic remain in the spent broth and these, too, require oxygen for their degradation. Many of the ingredients added to the growing media are soluble organic salts which are essential for the growth of the microorganism and these, too, are carried through to some extent with the spent broth and in many cases, require oxygen for their degradation or conversion to a non-dissolved condition wherein they can be removed from the broth by mechanical means. In practice the biological and chemical oxygen demand of spent broth from a fermentation wherein the antibiotic activity is removed as described immediately above will be from about 20 to 25 grams per liter. The disposal of spent broth having this great a quantity of oxygen demand has always presented a difficult problem to the antibiotics manufacturer.

One of the classic procedures followed in reducing the biological and chemical oxygen demand of such spent broth to a level suitable for the discharge of such broth into the environment has comprised the steps of (1) adjusting to a pH to perhaps about 6.5 to 7.0; (2) adding either aerobic or anerobic activated sludge (microbial mass) to such pH adjusted broth and vigorously agitating such a mixture for an extended period of time; (3) clarifying such activated sludge containing broth either by settling or filtration; and (4) subjecting the clarified spent fermentation broth to a biological oxidation process wherein oxygen is continuously introduced into the broth until the biological and chemical oxygen demand is reduced to a level which is suitable for the discharge of such broth into the environment. At the present time the Environmental Protection Agency has set standards for the discharge of such material into the environment of no more than a biological oxygen demand of 0.04 grams per liter.

In the useful process of this invention one of the operations is referred to as reverse osmosis. The principle of reverse osmosis has been applied to the concentration of such diverse materials as enzymes, food, including such products as egg white, dextrin and whey, and beverage products. Many attempts were made by the inventor hereof to concentrate antibiotics through the use of the reverse osmosis principle but it was not until the reverse osmosis operation was combined with the elimination of the need for the filter aid and the subsequent removal of the suspended solid material through a series of steps which provided feed stock to the reverse osmosis operation which was essentially free of all extraneous material was the operation successful.

Accordingly, it is an object of this invention to provide a process for reducing the biological and chemical oxygen demand of spent antibiotic fermentation broth to a level wherein simple ion exchange, carbon absorption or biological treatment can then further bring the oxygen demand down to a level whereat it is suitable for the discharge of such fluid into the environment.

Yet another object of this invention is to increase the recovery of antibiotics from the fermentation broth by concentrating the antibiotic activity in such broth prior to the solvent extraction of the antibiotic from the broth.

Yet another object of this invention is to reduce the quantity of solvents required to extract the antibiotic activity from the fermentation broth.

Yet another object of this invention is to eliminate the need for the addition of a filter aid to the fermentation broth prior to the separation of the mycelial solids therefrom and consequently lower the volume of removed solids that must be treated before disposal.

Yet another object of this invention is to provide for the isolation of the antibiotic activity from the fermentation broth with smaller facilities and greater economy.

SUMMARY

It has now been discovered that the biological and chemical oxygen demand of the spent broth from an antibiotic fermentation process can be reduced to the level of from about 0.2 to about 0.4 g/liter by a process comprising the steps of:

1. commingling a coagulant selected from the group consisting of aluminum chloride, aluminum sulfate or polyacrylonitrile with the antibiotic activity containing fermentation broth, with the pH adjusted to 6.5 to 7;

2. commingling a viscosity adjusting agent selected from the group consisting of deionized water, tap water on reverse osmosis permeate with the broth from step (1);

3. removing the suspended solids from the fermentation broth of step (2) by subjecting such broth to a series of solids removing means, including a coalescing strainer;

4. elevating the pressure of the stream of broth from the solids removing means to from about 200 psig to about 500 psig;

5. contacting the broth from step (4) with a semi-permeable membrane having the capacity to restrict the flow of molecules having a molecular weight slightly below that of the moelcular weight of the antibiotic contained in such broth;

6. maintaining a contact between the semi-permeable membrane of step (5) and the broth of step (4) until the antibiotic broth is concentrated from about 5- to about 10-fold by the transfer of water from such broth through said semipermeable membrane;

7. extracting the antibiotic activity from the concentrated broth of step (6) by commingling such broth with a water-immiscible solvent into which the antibiotic activity is partitioned;

8. dehydrating the antibiotic activity containing solvent wherein the entrapped broth carried along with the solvent in the extraction process is removed;

9. elevating the pressure of the broth removed in step (8) from about 200 to about 500 psig;

10. contacting the broth from step (9) with a semi-permeable membrance as described in step (6) and in such operation, concentrating the antibiotic activity in the water from about 5- to about 10-fold by the transfer of water from such broth through the semi-permeable membrane;

11. returning the concentrated antibiotic activity containing broth to the extraction process, and, 12. commingling the permeate from step (6) and step (10) for additional treatment or reuse.

DESCRIPTION OF THE PREFERRED EMBODIMENTS

The novel process of this invention for reducing the biological and chemical oxygen demand of spent antibiotic fermentation broth comprises the following steps.

a. The antibiotic activity containing fermentation both is commingled with one or more coagulants selected from the group consisting of aluminum chloride, aluminum sulfate or polyacrylonitrile and visocity adjusting chemicals selected from the group consisting of deionized water, tap water, or reverse osmosis permate.

b. The treated broth from step (a) is subjected to means for removing the undissolved solids therefrom.

c. The undissolved solids-free broth from step (b) is subjected to a coalescing strainer to remove the residual coalesced colloids and gels therefrom.

d. The clear anitbiotic activity containing fermentation broth from step (c) is subjected to a pressure elevating means to increase the pressure on such broth to from about 200 to about 500 psig.

e. The broth from step (d) is fed to a reverse osmosis element comprising a semi-permeable membrane adapted to retain dissolved solids having a molecular weight slightly below the molecular weight of the antibotic activity contained in said broth.

f. The antibiotic activity containing broth under a pressure of from about 200 to about 500 psig is maintained in contact with said semi-permeable membrane until the concentration of the antibiotic activity therein is increased from about 5- to about 10-fold, and from about 80 to about 90 percent of the volume of such broth is passed through said semi-permeable membrane.

g. The concentrated antibiotic activity containing broth from step (f) is fed to a solvent extraction operation wherein the antibiotic activity is partitioned into a water-immiscible solvent.

h. The essentially antibiotic activity free spent broth passing through the smie-permeable membrane in step (f) is collected for reuse or for further treatment before discharge into the environment at a biological and chemical oxygen demand level suitable for such release.

i. The water-immiscible solvent containing the antibiotic activity from step (g) is separated from the broth with which it was commingled in such step and delivered to a cyrstallizing operation for the removal of the antibiotic activity containing material or substances therefrom and subsequently on to a solvent recovery operation.

j. The spent broth separated from the solvent in step (i) is contacted with a semi-permeable membrane in a reverse osmosis element as in step (e) utilizing a pressure elevating means for applying pressure offrom about 200 to about 500 psig to such broth.

k. The antibiotic activity containing broth from step (j) is maintained in contact with said semi-permeable membrane of the reverse osmosis element until the antibiotic acitivty is increased from 5- to 10-fold, and from about 80 to about 90 percent of the volume of such broth is passed through said semi-permeable membrane.

l. The antibiotic activity free water permeating the membrane of the reverse osmosis operation is collected for reuse or for further treatment before discharge into the environment at a biological and chemical oxygen demand level suitable for such release.

m. The concentrated antibiotic activity containing water from step (k) is returned to the extraction operation for the removal of said activity therefrom.

The useful antibiotics which are produced by growing various microorganisms in suitable nutritive environments must be separated from the resultant fermentation broth in order to obtain such antibiotics in a useful form. Among the many useful antibiotics are such well known names as for example penicillin, streptomycin, tetracycline, aureomycin, vancomycin, ilotycin, tylosin, monensin, cephalosporin C, and the like. In all cases the fermentation broth containing the useful antibiotic is also heavily laden with residual nutrients which have been provided to induce the growth of the microorganism. And in the growth of the microorganism which produces these useful antibiotics there is developed a large quantity of biological materials known as mycelia. As the microorganisms proliferate the quantity of mycelia which results from such growth continuously increases until the fermentation broth is quite heavily burdened with undissolved biologically degradable solids.

In addition to the undissolved solids content of the fermentation broth there is a high concentration of dissolved material in such broth that is not part of the antibiotic activity. These dissolved materials come principally from the nutrients that are needed for the growth of the microorganisms. And in most, if not all, cases these dissolved materials are either biologically or chemically degradable materials.

In the novel process of this invention the undissolved solids, the principal dissolved materials (both organic and inorganic) and the antibiotic activity are removed from the fermentation broth, leaving a waste water which is remarkably low in its biological and chemical oxygen demand and dissolved solids so that such waste water can be rendered suitable for discharge into the environment by contacting such waste water with an ion exchange resin or any other conventional device. Alternatively, such waste water is of such a biological and chemical purity that it can be reused in the antibiotic fermentation processes without fruther treatment.

This novel process also eliminates the need for the addition of diatomaceous earths which are presently used as a filter aid in the removal of the mycelia from the fermentation broth.

In the instant process the fermentation broth is first treated with one or more coagulants selected from the group consisting of aluminum chloride, aluminum sulfate, or polyacrylonitrile, to coagulate colloidally suspended material which is the result of the fermentation process. These coagulants are added to the fermentation broth which contains the antibiotic activity along with such chemical adjuvants as sulfuric acid or sodium hydroxide to adjust the pH for maximum coagulation, and deionized water, tap water or reverse osmosis permeate for viscosity adjustments which are effective in adjusting the viscosity of the fermentation broth prior to the removal of the suspended solids therefrom. After such coagulants, pH and viscosity adjusting chemicals and materials have been added to the fermentation broth the combined materials are vigorously agitated to achieve a homogenous dispersion. The treated fermentation broth is conveyed to a first stage solids removing means which accomplishes the removal of essentially all of the undissolved materials in the treated broth. The means for doing this can be selected from such apparatus as a centrifuge, a clarifier-decanter, a continuous rotary vacuum filter, a string filter or the like, preferably a high-speed centrifuge. In this first stage solids removing operation it is useful to attempt only to remove a substantial portion of such solids in order that a high capacity can be realized. If an attempt is made to removae all of such solids at this point such an operation would require either equipment of such a size as to be of doubtful economics or the rate at which such removal would take place would be so low as to impede the process and add to its cost. From the first stage solids removal operation, the substantially solids-free antibiotic-containing fermentation broth is conveyed to a second stage solids removing means, which can be the same of different from that employed in the first stage; said second solids removing means being designed to yield a clear fermentation broth essentially free of undissolved solids. The same kinds of equipment can be employed in this second stage solids removal as was described hereinbefore in connection with the first stage solids removal.

After having been clarified to the extent that essentially all of the undissolved mycelia and other solids have been removed from the fermentation broth, said broth is conveyed to a coalescing strainer which in effect is utilized to separate any emulsified fluid and to remove the coalesced colloids and gels which are not removed by the solids removal means. The coalescing strainer is essentially a device in which the stream of fermentation broth is directed at a high velocity against a porous plate on which the coalesced material is impinged. Inasmuch as this coalesced material is not soluble in the fermentation broth it slowly ascends to the top of said porous plate where it is collected and separated from the main stream of said broth.

The clarified antibiotic activity containing fermentation broth leaving the coalescing strainer is conveyed to the suction side of a high pressure pump and said broth is discharged from said pump under a pressure of from about 200 to about 500 psig. Under this high pressure said fermentation broth is contacted with one side of a semi-permeable membrane and a reverse osmosis operation is performed. Under the high pressure, instead of the flow of dissolved antibiotic activity going from the concentrated to the less concentrated medium, the water phase of the fermentation broth is forced through the semi-permeable membrane leaving behind a continuously increasing concentration of antibiotic activity in such broth. The fermentation broth under the high pressure as described hereinbefore is maintained in contact with the semi-permeable membrane utilized in the reverse osmosis operation until the concentration of the antibiotic activity is increased from 5- to 10-fold and about 80 to about 90 percent of the volume of such broth is passed through said semi-permeable membrane. Preferably the concentration should be increased to the highest ratio consistent with the economics of the operation.

The semi-permeable membrane which is contacted in the reverse osmosis operation of this invention can be comprised of such materials as polyacetate, polyvinylacetate, polypropylene, cellulose acetate, polyethylene, cellulose nitrate, and the like, all of which are commercially available. Generally the thickness of the membrane will be from about 50 to 100 microns. Such membrane is usually laminated to a film having a porosity much greater than that of the membrane and the combination of such laminate is usually about 1 mil thick. The film to which the semi-permeable membrane is laminated provides strength and support under the high pressures utilized in the reverse osmosis operation. Moreover, such laminate is of necessity backed up by structures which provide mechanical support and, as a consequence, resist the high pressures employed in such operation. The total areas of the laminate are designed to provide a flow rate that will be consistent with the needs of the process. Under the pressures employed in the novel process of the instant invention approximately 100 square feet of semi-permeable membrane are needed for each gallon of permeate flowing per minute. Those skilled in the art will understand the mechanical requirements of the reverse osmosis operation.

The concentrated fermentation broth from the reverse osmosis operation contains the antibiotic activity which is removed therefrom by partitioning of such activity into a water-immiscible solvent. Several organic solvents are useful in effecting this partitioning, such as methanol, acetone, amyl alcohol, isopropanol, hexane, anyl acetate, and the like. In the partitioning operation a substantial portion of the antibiotic activity is transferred from the fermentation broth to the water immiscible solvent. However, generally an economically important quantity of the antibiotic activity remains in the fermentation broth and even though the partitioning may be essentially complete in order to prepare the spent broth for possible reuse or further processing for discharge to the environment, such broth is again subjected to a reverse osmosis operation. In the latter reverse osmosis operation the concentration of the residual antibiotic is again increased from 5- to 10-fold by subjecting such broth to a pressure of from about 200 to about 500 psig and contacting such broth under this pressure with a semipermeable membrane in a reverse osmosis element. With the semi-permeable membrane in the reverse osmosis operation adapted to retain dissolved antibiotic activity having a molecular weight above about 100, or alternatively adapted to restrict the penetration of molecules having a molecular weight slightly below that of the molecular weight of the antibiotic being concentrated, a substantial fraction of the broth penetrates the semi-permeable membrane and comes out on the opposite side essentially free of antibiotic activity and consequently contains a minimum of material having a biological or chemical oxygen demand to complete its degradation. Such waste water can be reused in an antibiotic fermentation process, or treated further for discharge to the environment.

The spent broth subjected to the concentration procedure in the reverse osmosis operation is commingled with a water-immiscible solvent as before and the antibiotic activity partitioned into the latter.

The antibiotic activity contained in the water-immiscible solvent from which the residual spent broth has been removed is conveyed to a crystallization step in which the antibiotic activity is removed and the solvent is then directed to a solvent recovery operation.

Where it is indicated that economically important quantities of antibiotic activity remains in the mycelia fraction that is removed in the first and second stage solids removal means such antibiotic activity should and can be recovered by conveying the mycelia to a mycelia wash vessel and vigorously agitating such mycelia with either fresh water or the spent broth as discharged from the useful process of this invention. Where such mycelia contain important quantities of antibiotics within the cellular structure a masceration procedure can be utilized to recover such quantities of antibiotic activity therefrom. When this is carried out as a part of the process, the mascerated mycelia is again diluted out with fresh water or spent broth discharged from this process and such processed mycelia as described hereinabove returned to the process for reducing the biological or chemical oxygen demand of the discharge antibiotic activity containing spent broth. This requires that such processed mycelia reenter the process prior to the first stage solids removal means.

Alternatively the mycelia removed in the first and second stage solids removal means can be diverted to a drying operation for the removal of the moisture contained therein and such mycelia can then be delivered to by product processing units to be used where the antibiotic activity is compatible with the nutritional requirements of certain livestock as part of the feed for such animals, or disposed of by burning or in a sanitary landfill or by any other economical and practical method(s).

In the useful process of the instant invention the biological and chemical oxygen demand of the discharged spent broth is from about 8- to 10-fold lower than that experienced in the usual procedure for removing antibiotic activity from fermentation broth. The usual procedure encompasses the addition of a diatomaceous earth to the fermentation broth as a filter aid prior to the filtration of the broth to remove the mycelia contained therein. After the mycelia is removed, the broth is subjected to a solvent extraction procedure which removes substantially all of the antibiotic activity contained in such broth. Consequently, there is likely a significant amount of antibiotic activity left in the spent broth (frequently 5 to 150 mcg/liter or higher) which must be degraded in some fashion prior to the discharge of such spent broth into the environment. For example, the biological and chemical oxygen demand of a typical tylosin spent broth ranges from about 20 to about 25 grams of oxygen per liter. This figure represents the amount of oxygen required to completely degrade the organic and chemical material remaining in such broth. By utilizing one of the conventional treatment methods, which comprises a pH adjustment, recycling with an activated sludge component added thereto and subsequent clarification, the biological and chemical oxygen demand of the broth so treated can be reduced to from about 4 to 5 grams of oxygen per liter. This high oxygen demand requires additional processing through such steps as may be appropriate, for example, artificial oxygenation by one of many means known to the art before such broth can be released to the environment.

Contrasted with this conventional process, the useful process of the instant invention reduces the biological and chemical oxygen demend of the permeate from the reverse osmosis operation to from about 0.2 to about 0.4 grams of oxygen per liter or less. The remaining organic and chemical materials which account for this low oxygen demand can be readily removed by such means as a passage over a deionizing resin column to meet the present standard of the Environmental Protection Agency of a biological or chemical oxygen demand of no more than 0.04 grams of oxygen per liter for waste water released to the environment.

Alternatively, after the antibiotic activity has been concentrated in the reverse osmosis operation,, such concentrated broth can be lyophilized to further concentrate the antibiotic activity in such broth prior to the solvent extraction operation.

For example, a cephalosporin C containing broth can be concentrated from about 0.004g/g activity in the reverse osmosis operation to about 0.04g/g, and further by lyophilization from about 0.04g/g to about 0.4g/g activity. The conditions required to achieve the tenfold concentration by freeze drying required freezing at about -7°C and drying at about -1°C for about 8 hours under a vacuum of about 12 mm of mercury.

In the following description of the mechanical embodiments of this invention, reference is made to the accompanying drawing.

Figure 1:
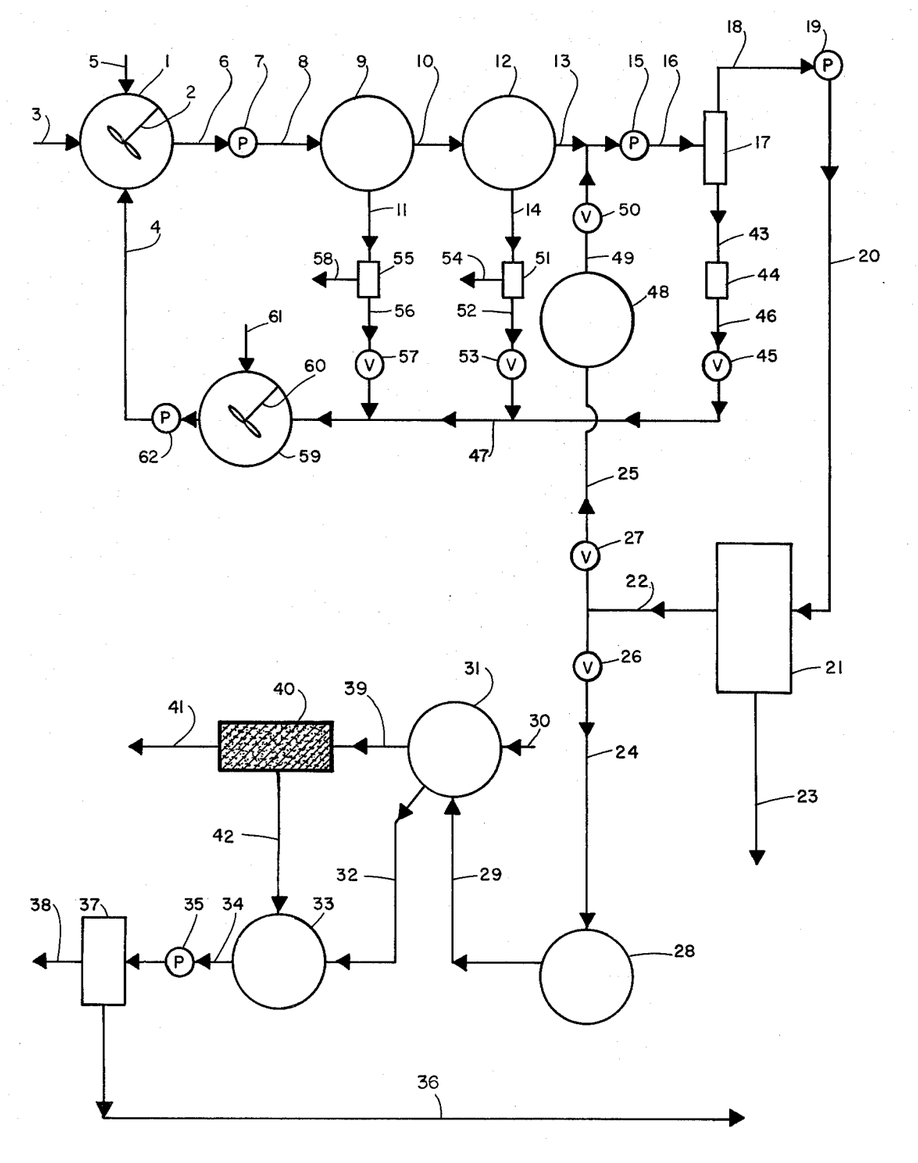
The accompanying drawing is a schematic diagram of the equipment involved in the process for reducing the biological and chemical oxygen demand of spent antibiotic fermentation broth to a level of from about 0.2 to about 0.4 g. of oxygen/liter.

Untreated fermentation broth is fed into a holding vessel 1 through a conduit 3. Holding vessel 1 can be a container of any configuration, and is equipped with an agitator 2. A cylindrical tank with a dished bottom and top is preferred as a holding vessel because better mixing conditions can be achieved in such a tank. The agitator 2, which can be a turbin, propeller or any other suitable design which is effective for mixing solids in a liquid into a homogenous dispersion. In the drawing the agitator 2 appears to be side entering. However, the required mixing can be provided just as well by either a top or bottom entering agitator 2.

Coagulants, pH, and viscosity adjusting agents can be fed into holding vessel 1 through conduit 5. Mycelia wash water can be introduced into holding vessel 1 through conduit 4.

In holding vessel 1 the required coagulants and viscosity adjusting agents are thoroughly mixed into the fermentation broth and the mycelia are homogenously dispersed therein by the vigorous action of agitator 2. From holding vessel 1 the treated fermentation broth is conveyed through conduit 6 to the suction side of pump 7 and discharged from pump 7 to a first means 9 for separating the undissolved material, principally mycelia, from such broth. The solids removing means 9 can be a centrifuge, a continuously revolving drum filter, a string filter or any of several other designs known to those skilled in the art, preferably a centrifuge. The solids removed by said means 9 are continuously taken away through conduit 11.

The fermentation broth, minus a substantial quantity of the solids is carried on to a second solids removing means 12 through conduit 10 if desired. As with solids removing means 9 said solids removing means 12 can be a centrifuge or any design of a filtration means that is appropriate to the process and such will be known to those skilled in the art. It is important that a substantially complete removal of the dispersed solids can be achieved by the time the liquid effluent is discharged from the second solids removing means 12. The solids which are removed by said means 12 are conveyed away through conduit 14. The undissolved solids-free fermentation broth is conveyed from said second solids removing means 12 through conduit 13 to the suction side of pump 15 and discharged from said pump 15 through conduit 16 into a coalescing strainer 17. The coalescing strainer 17 serves the purpose of removing coalesced colloidal and gelled particles which are not removed in the solids removing means 9 and 12. From coalescing strainer 17 the fermentation broth is fed through conduit 18 into the suction side of a high pressure pump 19 capable of generating discharge pressures in the range of from about 200 to about 500 psi. The coalesced material removed in the coalescing strainer 17 are conveyed away through conduit 43 and can eventually be returned to the holding vessel 1 through a series of operations which will be described hereinafter.

From the discharge side of high pressure pump 19 the fermentation broth is carried through conduit 20 to the reverse osmosis element 21. In the reverse osmosis element 21 there is is contained a semi-permeable membrane which is capable of stopping the flow therethrough of compounds having a moleuclar weight greater than 100 or in the alternative, molecules having a molecular weight slightly below the molecular weight of the antibiotic being processed. In the reverse osmosis element 21, the fermentation broth under a pressure as indicated heretofore is contacted with said semi-permeable membrane and such contact maintained until from about 80 to about 90 percent of the volume of said broth penetrates said semi-permeable membrane and the concentration of the antibiotic is increased from 5- to 10-fold.

By utilizing a semi-permeable membrane with a molecular weight cut-off of about 400 and above, the high pressure applied to the fermentation broth will cause a flow of the solvent from the concentrated side to the side opposite without permitting any of the dissolved material having such a molecular weiight to pass therethrough.

Consequently, the concentration of said dissolved material is greatly increased in the solvent, in this case water and the solvent which passes through a said semipermeable membrane is essentially free of all materials which can be labeled as either biologically or chemically in demand of oxygen for either metabolism or degradation. Inasmuch as a fair number of common antibiotics have molecular weights in excess of 400 such as tetracycline, streptomycin, ilotycin, monensin, tylosin, and the like, such a molecular weight cut off can be used effectively when these antibiotics are processed.

On the other hand certain antibiotics have molecular weights below 400 such as aureomycin, neomycin and penicillin. It is necessary that the reverse osmosis element be equipped with a semi-permeable membrane having the molecular weight cut-off of about 100 when these antibiotics are processed. It will be apparent to those skilled in the art that it is advantageous to utilize that semi-permeable membrane having the highest molecular weight cut-off consistent with the process in which materials having a molecular weight slightly above that retained by the membrane can be restrained from passing therethrough in order that the flow rates may be maintained at the highest level consistent with the principle of the reverse osmosis.

The conditions which make this process operate are the steps that are taken to remove the undissolved solids prior to the application of the reverse osmosis step and the pressure which is applied to the broth in the latter operation.

The waste water containing minimum organic matter, essentially no antibiotic-activity and exhibiting a low BOD or COD is conveyed from said reverse osmosis element 21 through conduit 23. This clean permeate, after analysis, can either be reused in the process or treated further if needed by such a simple precedure as a deionizing operation to render such permeate suitable for discharge into the environment, or for use in any suitable process.

The fermentation broth concentrated from 5 to 10 times in the reverse osmosis operation is conveyed away from such operation through conduit 22. From conduit 22 such concentrated broth can be directed to a holding tank 48 through conduit 25, or, when the concentrated fermentation broth is to be continued through the process for the isolation of the antibiotic activity contained therein, valve 26 is opened, valve 27 is closed, and the concentrated antibiotic broth is conveyed through conduit 24 to a receiver 28 from such broth is fed to a solvent extraction process through conduit 29 or alternatively, to a lyophylization operation before the solvent extraction procedure. In the solvent extraction process identified as 31 in the accompanying drawing a water-immiscible extraction solvent is introduced through conduit 30. With the concentrated broth and extraction solvent coming together in the extraction operation, the antibiotic activity is partitioned into the water-immiscible solvent by one of several extraction processes which are known to those skilled in the art. Generally, such as extraction procedure will be carried out in a counter-current flow which can be effected in mechanical apparatus designed for the purpose or in a simple counter-current extraction column wherein the heavier of the two immiscible liquids is introduced into the top and the lighter into the bottom. In any event the antibiotic activity is essentially transferred from the fermentation broth to the water-immiscible solvent. The spent broth is carried away through conduit 32 to a receiver 33. The solvent containing the antibiotic activity is conveyed from the extraction process through conduit 39 to a means 40 for removing the last vestiges of the fermentation broth from the solvent stream. This can be done either by a centrifuge, filtration or absorption operation. The broth-free solvent containing the antibiotic activity is conveyed to a crystallization procedure and subsequent solvent recovery through conduit 41. The spent broth removed in the scavengering operation at 40 is carried through conduit 42 to the spent broth storage receiver 33.

The spent broth accumulated in receiver 33 is conveyed through conduit 34 to the suction side of pump 35 and from there to a second reverse osmosis element operating as was described for the first such element. The residual antibiotic acitivty contained in the spent broth entering the second stage reverse osmosis element 37 is concentrated to from 5 to 10 times the dissolved material content and such is discharged therefrom through conduit 38 and returned to the extraction receiver 31 from whence it is again cycled through the extraction process.

The clear permeate from the reverse osmosis element 37 is carried through conduit 36 and as with the clear permeate from the first reverse osmosis operation is of a quality that can be reused or alternatively can be passed over a deionizing bed and meet the requirement for both biological and chemical oxygen demand for waste materials to be discharged into the environment. If it is preferred, this waste water, as with the waste water from the first reverse osmosis element, can be reused in the fermentation process or as mcyelia wash water. As was indicated earlier, the concentrated fermentation broth from the first stage reverse osmosis can be conveyed through conduit 25 to the holding tank 48. This can be accomplished by opening valve 27 and closing valve 26. From the holding tank 48 the concentrated fermentation broth can be conveyed through conduit 49 to the suction side of pump 15 and recycled through the coalescing strainer 17 and the first stage reverse osmosis element 21. A valve 50 is shown in the conduit 49.

The mycelia removed from the fermentation broth by said solid removing means 9 and 12 respectively and carried away therefrom through conduits 11 and 14 respectively can be diverted at the elements designated as 55 and 51 which are conveying means, respectively to either a drying operation through conduits 58 and 54, respectively, or through conduits 56 and 52, respectively, to a mycelia wash tank 59 as the antibiotic activity and concentration justifies. Valves 57 and 53 are shown in the conduits 56 and 52, respectively, and are utilized in the diversion of the mycelia to said mycelia wash tank 59; both diversions being shown as trying into conduit 47 which enters the mycelia wash tank 59.

The wash tank 59 is equipped with an agitator 60 and either fresh make up water or the clear permeate being conveyed from the process through conduits 23 and 36 respectively can be introduced into the mycelia wash tank 50 through conduit 61. Inasmuch as certain of the antibiotics are retained in the mycelia in economically important amounts, the mycelia wash tank serves the purpose of recovering a significant amount of this antibiotic activity through a washing, and perhaps even a mascerating operation, which releases the antibiotic substance into the wash water. Such wash water containing an economic quantity of antibiotic activity can be conveyed through conduit 4 to the holding vessel 1 with pump 62 being utilized to make the transfer. When this is done the wash water containing the mycelia can be either added to the fermentation broth in holding vessel 1 or it can be conveyed through the entire process beginning with the steps in the operation which begin with the presence of material in holding vessel 1 having antibiotic activity contained therein.

The instant useful process for reducing the biological and chemical oxygen demand of spent antibiotic-activity frementation broth is more clearly illustrated in Example 1 which follows.

EXAMPLE 1

Four liters of tylosin fermentation broth were placed in a suitable vessel and about 5 grams of aluminum chloride added thereto as a coagulant. This mixture was vigorously agitated for about 5 minutes and fed to a first stage solids removal centrifuge at the rate of about 2.5 liters per minute. The centrifuge was generating about 6,000 gs. About 2.9 liters of effluent containing about 0.13 percent suspended solids were delivered from the centrifuge. The centrifuge discharged approximately 1.1 liters of concentrated suspended solids which analyzed 20.5 percent dry solids. The 2.9 liters of effluent from the first stage solids removal centrifuge were fed to a similarly operating second stage solids removal centrifuge (also at 6,000 gs.) at the rate of approximately 0.4 liters per minute. The second stage solids removal centrifuge delivered 1.88 liters of substantially clear effluent containing approximately 50 ppm suspended solids. The second stage solids removal centrifuge discharged 1.01 liters of concentrated suspended material which analyzed 20.8 percent dry solids. The clarified effluent from the second stage solids removal centrifuge was conveyed to a coalescing strainer where the last of the suspended solids and coalesced colloids and gels were removed. The 2.11 liters of concentrated solids from the first and second solids removal centrifuges were set aside for recycling.

Approximately 1.7 liters of tylosin containing effluent from the coalescing strainer were pumped under a pressure of 200 psig to a reverse osmosis element which utilized a semi-permeable membrane of cellulose acetate having the capaciity to restrict the flow of compounds with a molecular weight greater than 200. Approximately 1.42 liters of permeate water was collected on the reverse side of the semi-permeable membrane. And about 0.28 liters of concentrated tylosin containing fermentation broth was taken from the contact side of the reverse osmosis element. This respresented a concentration ratio of approximately 5:1.

The semi-permeable membrane utilized in this experiment had a surface area of approximately 50 square feet. The rate of flow through the element was approximately 4.0 liters per minute maximum.

The permeate water was crystal clear and was found on analysis to have a biological and chemical oxygen demand of approximately 0.23 grams per liter. The tylosin activity in the original fermentation spent broth was about 875 mcg per ml. The concentrate removed from the reverse osmosis element analyzed about 4400 mcg per ml.

The reduction of the biological and chemical oxygen demand to the 0.23 grams of oxygen per liter represented approximately a 20-fold lowering of the oxygen requirements over that experienced in the conventional process for treating spent fermentation broth through a pH adjustment, cycling with activated sludge, and subsequent clarification.

What is claimed is:

1. A process for reducing the biological and chemical oxygen demand of spent antibiotic fermentation broth comprising:
   a. commingling a coagulant with an antibiotic activity containing fermentation broth;
   b. passing the broth from step (a) through a solids removing means;
   c. flowing the broth from step (b) through a coalescing strainer;
   d. elevating the pressure on the broth from step (c) to from about 200 to about 500 psig;
   e. contacting the pressurized broth from step (d) with a semi-permeable membrane adapted to restrict the flow therethrough of molecules having a molecular weight slightly below that of the molecular weight of the antibiotic activity contained in such broth;
   f. maintaining the contact between said pressurized broth and said semi-permeable membrane until from about 80 to 90 percent of the volume of said broth passes through said membrane essentially free of antibiotic activity becoming permeate;
   g. extracting the antibiotic activity from the concentrated fermentation broth from step (f) by commingling such broth with a water-immiscible partitioning solvent;
   h. separating the antibiotic activity containing solvent from the extracted fermentation broth from step (g);
   i. elevating the pressure on the broth from step (h) to from about 200 to about 500 psig;
   j. contacting the pressurized broth from step (i) with a semi-permeable membrane as described in steop (e);
   k. maintaining the contact between said pressurized broth and said semi-permeable membrane as in step (f); and
   l. commingling the permeates from steps (f) and (k) for reuse or further treatment before discharge into the environment.

2. The process according to claim 1 wherein the coagulant commingled with the antibiotic activity containing fermentation broth is selected from the group consisting of aluminum chloride, aluminum sulfate, or polyacrylonitrile.

3. The process according to claim 1 wherein the undissolved solids are separated from the antibiotic activity containing fermentation broth in a two step centrifugation operation under a force of from about 6,000 to about 9,000 Gs.

4. The process according to claiim 1 wherein the antibiotic activity containing fermentation broth from which the undissolved solids and coagulated colloids and gels have been removed is conveyed to the suction side of a high pressure pump and the pressure on such broth elevated to from about 200 to about 500 psig.

5. The process according to claim 1 wherein there is about a 5- to 10-fold concentration of the antibiotic activity in such broth in the reverse osmosis operation in which from about 80 to 90 percent of the volume of such fermentation broth permeates the semi-permeable membrane to become an essentially antibiotic activity free and low oxygen demanding permeate.

6. The process according to claim 2 wherein the semi-permeable membrane which is contacted by the antibiotic activity containing fermentation broth is comprised of a material selected from the group consisting of cellulose acetate, polyethylene, polypropylene, cellulose nitrate, polyacetate, and polyvinylacetate.

7. The process according to claim 1 wherein the semi-permeable membrane is adapted to restrict the flow of molecules having a molecular weight greater than 100.

8. The process according to claim 1 wherein the contact between the antibiotic activity containing fermentation broth and the semi-permeable membrane in the osmosis operation is conducted at a pressure of approximately 200 psig.

9. A process for reducing the biological and chemical oxygen demand of spent antibiotic fermentation broth comprising:
   a. commingling a coagulant selected from the group consisting of aluminum chloride, aluminum sulfate, or polyacrylonitrile with an antibiotic activity containing fermentation broth;

b. separating the undissolved solids contained in the broth from step (a) by a two step centrifugation operation operated at from about 6,000 to about 9,000 gs;

c. separating the coagulated colloids and gels from the broth from step (b) by passing such broth through a coalescing screen;

d. conveying the broth from step (c) to the suction side of a high pressure pump and therein elevating the pressure on such broth to from about 200 to about 500 psig;

e. conveying the pressurized broth from step (d) to a reverse osmosis operation wherein such broth is contacted with a semi-permeable membrane which is adapted to restrict the passage therethrough of molecules having a molecular weight greater than 100;

f. maintaining the contact between said pressurized broth and said semi-permeable membrane until the antibiotic activity in such broth is concentrated from about 5- to about 10-fold and from about 80 to about 90 percent of the volume of said broth has permeated said membrane to become an essentially antibiotic activity and low oxygen demanding free permeate;

g. extracting the antibiotic activity from the concentrated broth from step (f) by commingling such broth with a water-immiscible partitioning solvent;

h. separating the antibiotic activity containing solvent from the extracted fermentation broth from step (g) by a decantation step followed by a centrifugation operation under a force of 6,000 gs on the solvent to remove the entrained water from such solvent and commingling such water with that separated in the decantation step;

i. conveying the spent broth from step (h) to the suction side of a high pressure pump and therein elevating the pressure of such spent broth to from about 200 to about 500 psig;

j. contacting the pressurized broth from step (i) with a semi-permeable membrane as described in step (e);

k. maintaining a contact between said pressurized broth and said semi-permeable membrane as in step (f); and l. commingling the permate from steps (f) and (k) for reuse or further treatment before discharge into the environment.

* * * * *

UNITED STATES PATENT AND TRADEMARK OFFICE
CERTIFICATE OF CORRECTION

PATENT NO. : 3,923,650
DATED : December 2, 1975
INVENTOR(S) : Robert H. L. Howe

It is certified that error appears in the above–identified patent and that said Letters Patent are hereby corrected as shown below:

Column 11, line 22, "from such" should read --from which such--.

Column 12, line 35, "50" should read --59--.

Column 14, line 45, "claim 2" should read --claim 1--.

Column 11, line 58, "acitivty" should read -- activity --.

Signed and Sealed this

Fourteenth Day of June 1977

[SEAL]

*Attest:*

RUTH C. MASON
*Attesting Officer*

C. MARSHALL DANN
*Commissioner of Patents and Trademarks*